(12) United States Patent
Yu et al.

(10) Patent No.: US 9,507,720 B2
(45) Date of Patent: Nov. 29, 2016

(54) BLOCK STORAGE-BASED DATA PROCESSING METHODS, APPARATUS, AND SYSTEMS

(71) Applicant: Huawei Technologies Co., Ltd., Shenzhen, Guangdong (CN)

(72) Inventors: Qiang Yu, Shenzhen (CN); Daohui Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 158 days.

(21) Appl. No.: 14/143,186

(22) Filed: Dec. 30, 2013

(65) Prior Publication Data

US 2014/0115252 A1    Apr. 24, 2014

Related U.S. Application Data

(63) Continuation of application No. PCT/CN2012/070626, filed on Jan. 19, 2012.

(51) Int. Cl.
*G06F 12/00* (2006.01)
*G06F 3/06* (2006.01)
*G06F 12/08* (2016.01)

(52) U.S. Cl.
CPC ........... *G06F 12/0866* (2013.01); *G06F 3/067* (2013.01); *G06F 3/0611* (2013.01); *G06F 3/0635* (2013.01)

(58) Field of Classification Search
CPC .................... G06F 12/0866; G06F 3/0635
See application file for complete search history.

(56) References Cited

U.S. PATENT DOCUMENTS

| 2003/0101317 A1 | 5/2003 | Mizuno et al. |
| 2004/0073765 A1 | 4/2004 | Arimilli et al. |
| 2007/0168336 A1* | 7/2007 | Ransil ................. G06F 17/3089 |

(Continued)

FOREIGN PATENT DOCUMENTS

| CN | 1489057 A | 4/2004 |
| CN | 101169760 A | 4/2008 |

(Continued)

OTHER PUBLICATIONS

"Hash Table," Wikipedia, https://en.wikipedia.org/w/index.php?title=Hash_table&oldid=79545648 (Oct. 4, 2006).

*Primary Examiner* — Eric S Cardwell
(74) *Attorney, Agent, or Firm* — Leydig, Voit & Mayer, Ltd.

(57) ABSTRACT

The present disclosure relates to the field of information technology, and in particular, to a block storage-based data processing method, apparatus, and system. The block storage-based data processing method provided in embodiments of the present disclosure is applied in a system including at least two storage nodes, each storage node including a CPU, a cache medium, and a non-volatile storage medium, and the cache medium in all the storage nodes forming a cache pool. According to the method, after receiving a data operation request sent by a client, a service processing node sends the data operation request to a corresponding storage node in the system according to a logical address carried in the data operation request, so that the data operation request is processed in the cache medium of the storage node under control of the CPU of the storage node.

8 Claims, 5 Drawing Sheets

(56) References Cited

U.S. PATENT DOCUMENTS

2010/0115078 A1  5/2010 Ishikawa et al.
2011/0082967 A1* 4/2011 Deshkar .............. G06F 12/0246
                                                            711/103

FOREIGN PATENT DOCUMENTS

CN          101663651 A      3/2010
CN          102223388 A      10/2011

* cited by examiner

BLOCK STORAGE-BASED DATA PROCESSING METHODS, APPARATUS, AND SYSTEMS

CROSS-REFERENCE TO RELATED APPLICATIONS

This application is a continuation of International Patent Application No. PCT/CN2012/070626, filed on Jan. 19, 2012, which is hereby incorporated by reference in its entirety.

TECHNICAL FIELD

The present disclosure relates to the field of information technology (Information Technology, abbreviated as IT), and in particular, to block storage-based data processing methods, apparatus, and systems.

BACKGROUND

With the development of information technology, demands of mass data impose new challenges to storage performance of a system, and a performance enhancement measure is to apply cache media in devices.

Figure 1:
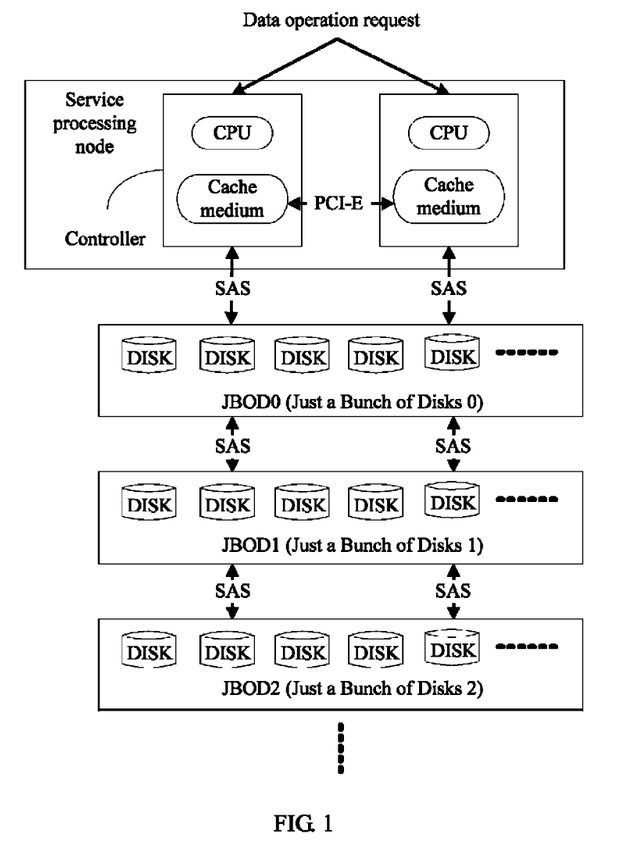
FIG. 1 is an architectural diagram of a block storage-based data processing system in the prior art.

In the prior art, a block storage-based data processing system generally employs a 1+N mode, that is, one service processing node responsible for processing services and N JBOD (Just a Bunch Of Disks, just a bunch of disks), as illustrated in FIG. 1. The service processing node includes two controllers, and a cache medium located in each controller that implements a read and write caching function for the JBOD. The controllers are connected to each other over a peripheral component interconnect express (PCI Express, abbreviated as PCI-E) channel, and data is transmitted between the controllers over the PCI-E channel. The controller is connected to the JBOD over a limited number of serial attached small computer system interface (Attached Small Computer System Interface, abbreviated as SAS) channels. When a large number of disks (DISK) need to be extended, due to the limited number of SAS channels, JBOD cascading is typically employed.

In the prior art, during JBOD extension in the block storage-based data processing system, the capacity of the cache medium in the service processing node needs to be accordingly increased. With respect to the cache medium, its scalability is limited by the development of hardware technologies, and becomes a bottleneck, restricting the practical function thereof. The prior art fails to provide an effective mechanism to solve the problem.

SUMMARY

An objective of embodiments of the present disclosure is to provide a block storage-based data processing method, apparatus, and system, which can enhance scalability of a cache medium in the data processing system.

In one aspect, an embodiment of the present disclosure provides a block storage-based data processing method, the method being applied in a system including at least two storage nodes, each storage node including a CPU, a cache medium, and a non-volatile storage medium, and the cache medium in all the storage nodes forming a cache pool. The method includes:

receiving, by a service processing node, a data operation request sent by a client, where the data operation request includes a logical address of a non-volatile storage block which the data operation request requests to operate, the non-volatile storage block being contained in the non-volatile storage medium;

determining, by the service processing node according to the logical address of the non-volatile storage block, an address of a storage node where the non-volatile storage block is located; and sending, by the service processing node, the data operation request to the storage node according to the address of the storage node, to enable the data operation request to be processed in the cache medium of the storage node under control of the CPU of the storage node.

In another aspect, an embodiment of the present disclosure provides a service processing node, which includes:

a receiver, adapted to receive a data operation request sent by a client, where the data operation request includes a logical address of a non-volatile storage block which the data operation request requests to operate;

a processor, adapted to determine, according to the logical address of the non-volatile storage block received by the receiver, an address of a storage node where the non-volatile storage block is located; and a sender, adapted to send, according to the address of the storage node determined by the processor, the data operation request received by the receiver to the storage node, to enable the data operation request to be processed in a cache medium of the storage node under control of a CPU of the storage node, where the storage node includes the CPU, the cache medium, and a non-volatile storage medium, the non-volatile storage block being contained in the non-volatile storage medium.

In another aspect, an embodiment of the present disclosure provides a block storage-based data processing system, including: a service processing node and at least two storage nodes, each storage node including a CPU, a cache medium, and a non-volatile storage medium, and the cache medium in all the storage nodes forming a cache pool, where:

the service processing node is adapted to: receive a data operation request sent by a client; determine, according to a logical address of a non-volatile storage block which the data operation request requests to operate, an address of a storage node where the non-volatile storage block is located, where the logical address is included in the data operation request; and send, according to the address of the storage node, the data operation request to the storage node where the non-volatile storage block is located; and the storage node is adapted to receive the data operation request sent by the service processing node, and process, under control of the CPU thereof, the data operation request in its cache medium.

According to the embodiments of the present disclosure, the service processing node finds, according to the logical address carried in the data operation request, the storage node corresponding to the data operation request in the data processing system. Each storage node in the data processing system includes an independent CPU, a cache medium, and a non-volatile storage medium, and the cache medium in all the storage nodes form a cache pool, so that the capacity of the cache pool is increased each time a storage node is added, thereby enhancing scalability of the cache medium in the data processing system.

DESCRIPTION OF EMBODIMENTS

The following clearly describes the technical solutions in the embodiments of the present disclosure with reference to the accompanying drawings in the embodiments of the present disclosure.

Figure 2:
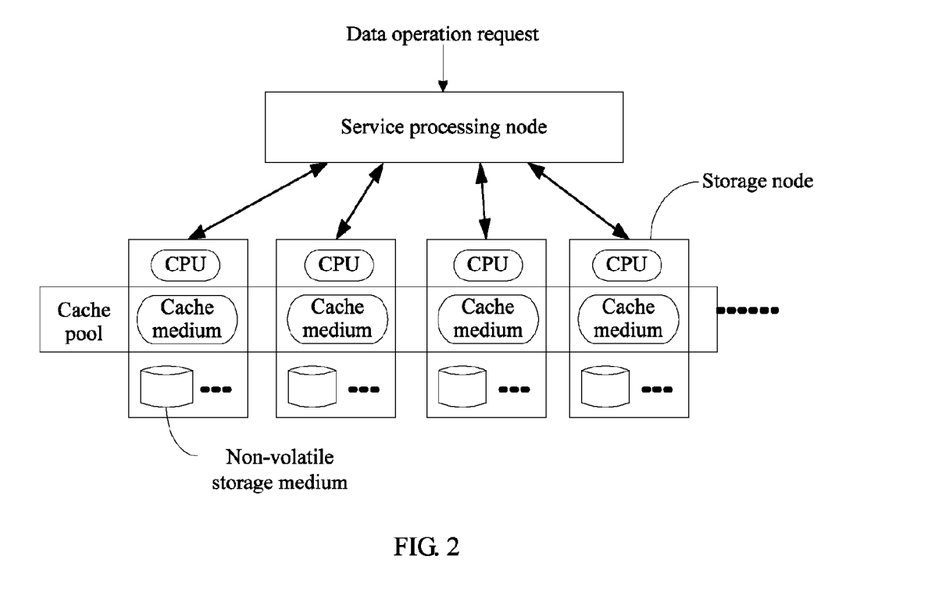
FIG. 2 is a schematic architectural diagram of a block storage-based data processing system according to an embodiment of the present disclosure.

FIG. 2 is a schematic architectural diagram of a block storage-based data processing system according to an embodiment of the present disclosure. The data processing system includes a service processing node and at least two storage nodes, where each storage node includes a CPU, a cache medium, and a non-volatile storage medium, the cache medium in each storage node forming a cache pool. After receiving a data operation request sent by a client, the service processing node forwards the data operation request to a storage node in the data processing system. After the data operation request sent by the service processing node is received, the data operation request is processed in the cache medium of the storage node under control of the CPU of the storage node.

The non-volatile storage medium in the storage node is defined relative to a cache medium. Generally, the capacity of the non-volatile storage medium is larger than that of the cache medium, and the non-volatile storage medium is specifically configured to store written data to avoid data loss. As an example rather than a limitation, the non-volatile storage medium includes, but not limited to, a flash memory, a CD-ROM, a digital versatile disc (DVD) or another optical storage device, or a magnetic card, a magnetic tape, a magnetic disk or another magnetic storage device. The cache medium generally refers to a memory configured to cache data read or written by a client, to enhance performance of the data processing system.

As can be seen from FIG. 2, all storage nodes in the data processing system are independent of each other, all the storage nodes form a storage pool (Storage Pool) of the data processing system, cache media in all the storage nodes form a cache pool (Cache Pool) of the data processing system, and the capacity of the cache pool is increased each time a storage node is added.

The storage space in the embodiments of the present disclosure is presented to users in the form of logical volumes, where each logical volume corresponds to a part of storage space in the storage pool, and each logical volume is partitioned into a series of logical blocks. The address (or offset) of a logical block in the logical volume is referred to as a logical block address (Logical Block Address, abbreviated as LBA), and each logical block carries a piece of identification information, where the identification information includes a logical volume number of the logical volume where the logical block is located, and a logical block address of the logical block. According to the identification information of the logical block, a non-volatile storage area (non-volatile storage block) corresponding to the logical block may be found.

Figure 3:
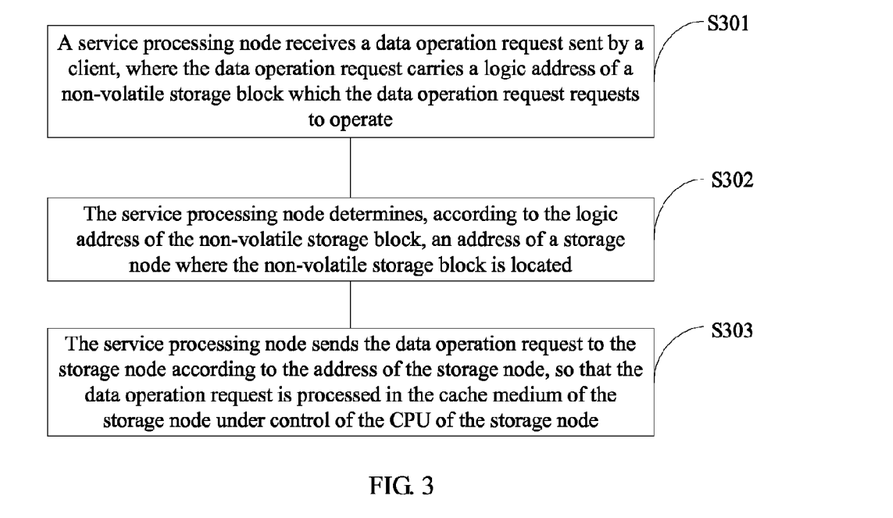
FIG. 3 is a flowchart of a block storage-based data processing method according to an embodiment of the present disclosure.

Based on the schematic diagram illustrated in FIG. 2, an embodiment of the present disclosure provides a block storage-based data processing system. As shown in FIG. 3, the method includes:

S301. A service processing node receives a data operation request sent by a client, where the data operation request carries a logical address of a non-volatile storage block which the data operation request requests to operate.

The non-volatile storage block is contained in the non-volatile storage medium.

The logical address may include a logical volume number corresponding to the non-volatile storage block, and a logical block address. For example, the data operation request requests to operate a logical volume with volume number 0, and the offset of a logical block to be operated is 1ba0 in the logical volume; in this case, the logical address includes the volume number 0 and the offset 1ba0.

S302. The service processing node determines, according to the logical address of the non-volatile storage block, an address of a storage node where the non-volatile storage block is located.

The service processing node may determine the address of the storage node where the non-volatile storage block is located in the following manner:

performing, by the service processing node, a hash operation on the logical address of the non-volatile storage block to obtain a hash value, and obtaining, according to the hash value, the address of the storage node where the non-volatile storage block is located corresponding to the hash value.

One logical address corresponds to one non-volatile storage block. Since the hash algorithm has a compression feature, a same hash value may be obtained after an hash operation is performed on logical addresses of a plurality of non-volatile storage blocks. This indicates that the plurality of non-volatile storage blocks is located in different positions of a same storage node.

Optionally, mapping relationships between hash values and addresses of storage nodes may be preconfigured in the service processing node. For example, if the data processing system has 100 storage nodes, 100 mapping relationships between hash values and addresses of storage nodes are preconfigured.

The service processing node may obtain the address of the storage node where the non-volatile storage block is located corresponding to the hash value in the following manner:

searching, by the service processing node according to the hash value, in the preconfigured mapping relationships for a mapping relationship between the hash value and the address of the storage node where the non-volatile storage block is located, and obtaining the address of the storage node where the non-volatile storage block is located from the found mapping relationship.

S303. The service processing node sends the data operation request to the storage node according to the address of the storage node, so that the data operation request is processed in the cache medium of the storage node under control of the CPU of the storage node.

Under control of the CPU of the storage node, the data operation request may be processed in the cache medium of the storage node in the following manner:

if the data operation request is a write request, under control of the CPU of the storage node, storing, by the cache medium of the storage node, a mapping relationship between data carried in the write request and the logical address; or if the data operation request is a read request, under control of the CPU of the storage node, obtaining, by the storage node, from the cache medium of the storage node according to the logical address, data requested by the read request, and returning the data requested by the read request to the client.

Optionally, the storing, by the cache medium of the storage node, a mapping relationship between data carried in the write request and the logical address specifically refers to storing, by the cache medium of the storage node, the data carried in the write request, the logical address carried in the write request, and the mapping relationship between the data and the logical address.

Herein, it should be noted that the service processing node obtains the address of the storage node according to the logical address carried in the data operation request, and sends the data operation request to the storage node according to the obtained address of the storage node; after receiving the data operation request, under control of the CPU, the storage node processes the data operation request in the cache medium thereof; after a period of time, the CPU of the storage node will access, according to the logical address, the non-volatile storage block which the data operation request requests to operate.

According to the block storage-based data processing method provided in the embodiment of the present disclosure, the service processing node finds, according to the logical address carried in the received data operation request, the storage node corresponding to the data operation request in the data processing system. Each storage node in the data processing system includes an independent CPU, a cache medium, and a non-volatile storage medium, and the cache medium in each storage node forms a cache pool, so that the capacity of the cache pool is increased each time a storage node is added, thereby enhancing scalability of the cache medium in the data processing system. Secondly, since the storage node includes an independent CPU, which is capable of independently processing the data operation request in the cache medium of the storage node, the caching and processing capability of the data processing system is increased each time a storage node is added. Additionally, a separate access channel is provided between the cache medium and the non-volatile storage medium of each storage node; from the perspective of the system, the number of access channels between the cache media and the non-volatile storage media is equal to the number of storage nodes in the data processing system, thereby improving performance of the data processing system in reading and writing data. Furthermore, the service processing node determines the address of the storage node according to the logical address carried in the data operation request, and forwards the data operation request to the storage node according to the address of the storage node. Compared with the prior art, tasks of caching and processing the data operation request are distributed to the storage nodes of the data processing system for processing, thereby reducing load of the service processing node. Still further, when the storage node receives the write request sent by the service processing node, the cache medium of the storage node stores the mapping relationship between the data carried in the write request and the logical address. Data can be written more quickly in the cache medium than in the non-volatile storage medium, thereby improving performance of the system.

Figure 4:
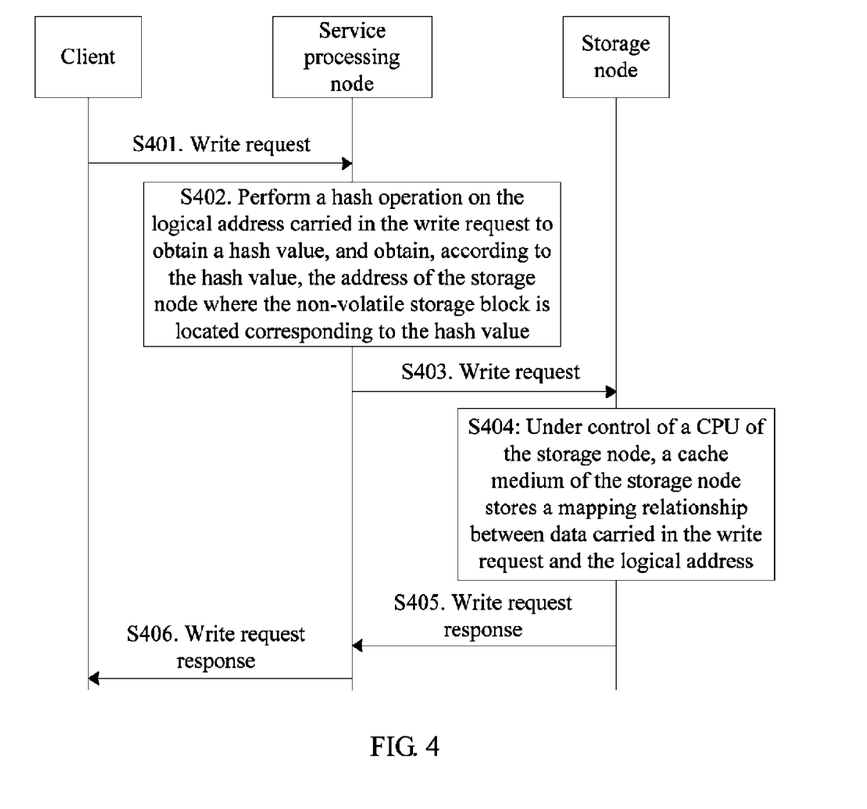
FIG. 4 is a flowchart of another block storage-based data processing method according to an embodiment of the present disclosure.

FIG. 4 is a flowchart of a block storage-based data processing method according to an embodiment of the present disclosure. In this embodiment, a data operation request sent by a service processing node to a storage node is, for example, a write request. This embodiment specifically includes:

S401. A client sends a write request to a service processing node, where the write request carries a logical address of a non-volatile storage block which the write request requests to operate.

The logical address may include a logical volume number corresponding to the non-volatile storage block, and a logical block address. For example, the write request requests to operate a logical volume with volume number 0, and the offset of a logical block to be operated is 1ba0 in the logical volume; in this case, the logical address includes the volume number 0 and the offset 1ba0.

S402. The service processing node performs a hash operation on the logical address carried in the write request to obtain a hash value, and obtains, according to the hash value, the address of the storage node where the non-volatile storage block is located corresponding to the hash value.

Mapping relationships between hash values and addresses of storage nodes may be preconfigured in the service processing node. For example, if a data processing system has 100 storage nodes, 100 mapping relationships between hash values and addresses of storage nodes are preconfigured.

The service processing node may obtain the address of the storage node where the non-volatile storage block is located corresponding to the hash value in the following manner:

searching, by the service processing node, according to the hash value, in the preconfigured mapping relationships for a mapping relationship between the hash value and the address of the storage node where the non-volatile storage block is located, and obtaining the address of the storage node where the non-volatile storage block is located from the found mapping relationship.

S403. The service processing node sends the write request to the storage node according to the address of the storage node.

S404: Under control of a CPU of the storage node, a cache medium of the storage node stores a mapping relationship between data carried in the write request and the logical address.

The storage node includes the CPU, the cache medium, and a non-volatile storage medium, where the non-volatile storage block is contained in the non-volatile storage medium.

The cache medium of the storage node may store the mapping relationship between the data carried in the write request and the logical address in the following manner:

if the write request hits a cache block in the cache medium, storing the mapping relationship between the data carried in the write request and the logical address into the hit cache block; for example, when the logical address carried in the write request is (volume 0, 1ba0), if the cache medium has a cache block that stores data corresponding to the logical address, directly updating the data in the cache block, and storing the mapping relationship between the data carried in the write request and the logical address; or if the write request fails to hit a cache block in the cache medium, when the cache medium has idle cache blocks, storing the mapping relationship between the data carried in the write request and the logical address into one of the idle cache blocks; for example, when the cache medium has no cache block that stores data corresponding to the logical address, if the cache medium has idle cache blocks, allocating an idle cache block from the idle cache blocks to store the mapping relationship between the data carried in the write request and the logical address; otherwise, waiting until the cache medium has idle cache blocks, and allocating an idle cache block from the idle cache blocks to store the mapping relationship between the data carried in the write request and the logical address.

The cache block is contained in the cache medium, and each cache medium may be partitioned into a plurality of cache blocks.

The idle cache blocks specifically include: cache blocks where data associated with the logical address is not stored, or cache blocks where the stored data has been written into the non-volatile storage medium.

Optionally, after the mapping relationship between the data carried in the write request and the logical address is stored, the cache block that stores the mapping relationship stores, according to the logical address in the mapping relationship, the data carried in the write request in the mapping relationship into a non-volatile storage block corresponding to the logical address. As an example rather than a limitation, the data carried in the write request in the mapping relationship may be stored into the non-volatile storage block when the CPU of the storage node is idle.

S405. The storage node sends a write request response to the service processing node.

S406. The service processing node sends the write request response to the client.

The storage node may send the write request response to the client in the following manner:

directly sending, by the storage node, the write request response to the client.

Optionally, to ensure reliability of the written data, the storage node may respectively back up data stored in the cache blocks into cache blocks of another storage node. If the data processing system has N storage nodes, the storage node may have N−1 channels connected to other storage nodes. Compared with the prior art, sufficient channels are provided for redundancy backup, and the number of channels will not become a bottleneck for redundancy backup.

According to the method provided in the embodiment of the present disclosure, the service processing node finds, according to the logical address carried in the received write request, the storage node corresponding to the write request in the data processing system. Each storage node in the data processing system includes an independent CPU, a cache medium, and a non-volatile storage medium, and the cache medium in each storage node forms a cache pool, so that the capacity of the cache pool is increased each time a storage node is added, thereby enhancing scalability of the cache medium in the data processing system. Secondly, since the storage node includes an independent CPU, which is capable of independently processing the read request in the cache medium of the storage node, the caching and processing capability of the data processing system is increased each time a storage node is added. Additionally, a separate access channel is provided between the cache medium and the non-volatile storage medium of each storage node; from the perspective of the system, the number of access channels between the cache media and the non-volatile storage media is equal to the number of storage nodes in the data processing system, thereby improving performance of the data processing system in reading and writing data. Furthermore, the service processing node determines the address of the storage node according to the logical address carried in the write request, and forwards the write request to the storage node according to the address of the storage node. Compared with the prior art, tasks of caching and processing the write request are distributed to the storage nodes of the data processing system for processing, thereby reducing load of the service processing node. Still further, when the storage node receives the write request sent by the service processing node, the cache medium of the storage node stores the mapping relationship between the data carried in the write request and the logical address. Data can be written more quickly in the cache medium than in the non-volatile storage medium, thereby improving performance of the system. Still further, each storage node may be provided with a plurality of channels connected to other storage nodes. In this way, the number of channels will not become a bottleneck for redundancy backup, thereby improving performance of redundancy backup.

Figure 5:
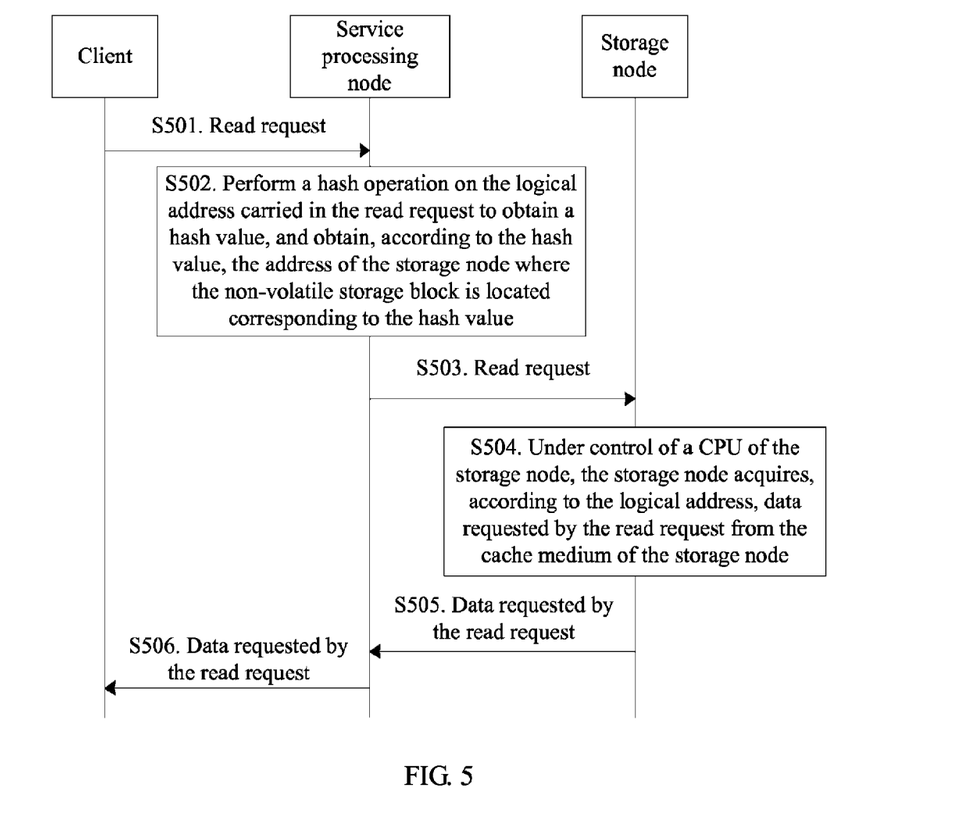
FIG. 5 is a flowchart of another block storage-based data processing method according to an embodiment of the present disclosure.

FIG. 5 is a flowchart of a block storage-based data processing method according to an embodiment of the present disclosure. In this embodiment, a data operation request sent by a service processing node to a storage node is, for example, a read request. This embodiment specifically includes:

S501. A client sends a read request to a service processing node, where the read request carries a logical address of a non-volatile storage block which the read request requests to operate.

The logical address may include a logical volume number corresponding to the non-volatile storage block, and a logical block address. For example, the read request requests to operate a logical volume with volume number 0, and the offset of a logical block to be operated is 1ba0 in the logical volume; in this case, the logical address includes the volume number 0 and the offset 1ba0.

S502. The service processing node performs a hash operation on the logical address carried in the read request to obtain a hash value, and obtains, according to the hash value, the address of the storage node where the non-volatile storage block is located corresponding to the hash value.

Mapping relationships between hash values and addresses of storage nodes may be preconfigured in the service processing node. For example, if a data processing system has 100 storage nodes, 100 mapping relationships between hash values and addresses of storage nodes are preconfigured.

The service processing node may obtain the address of the storage node where the non-volatile storage block is located corresponding to the hash value in the following manner:

searching, by the service processing node, according to the hash value, in the preconfigured mapping relationships for a mapping relationship between the hash value and the address of the storage node where the non-volatile storage block is located, and obtaining the address of the storage node where the non-volatile storage block is located from the found mapping relationship.

S503. The service processing node sends the read request to the storage node according to the address of the storage node.

S504. Under control of a CPU of the storage node, the storage node obtains, from a cache medium of the storage node according to the logical address, data requested by the read request.

The storage node may obtain, from the cache medium of the storage node according to the logical address, the data requested by the read request in the following manner:

if the read request hits a cache block in the cache medium according to the logical address, obtaining, from the hit cache block, the data requested by the read request hit; or if the read request fails to hit a cache block in the cache medium according to the logical address, when the cache medium has idle cache blocks, obtaining, by one of the idle cache blocks from the non-volatile storage block, the data requested by the read request; for example, if the cache medium has idle cache blocks, allocating an idle cache block from the idle cache blocks to obtain, from a non-volatile storage block corresponding to the logical address, the data requested by the read request; otherwise, waiting until the cache medium has idle cache blocks, and allocating an idle cache block from the idle cache blocks to obtain, from a non-volatile storage block corresponding to the logical address, the data requested by the read request.

Optionally, after the data requested by the read request is obtained, the cache block that obtains the data requested by the read request stores the mapping relationship between the data requested by the read request and the logical address.

S505. The storage node sends the data requested by the read request to the service processing node.

S506. The service processing node returns the data requested by the read request to the client.

The storage node may return the data requested by the read request to the client in the following manner:

directly returning, by the storage node, the data requested by the read request to the client.

According to the method provided in the embodiment of the present disclosure, the service processing node finds, according to the logical address carried in the received read request, the storage node corresponding to the read request in the data processing system. Each storage node in the data processing system includes an independent CPU, a cache medium, and a non-volatile storage medium, and the cache medium in each storage node forms a cache pool, so that the capacity of the cache pool is increased each time a storage node is added, thereby enhancing scalability of the cache medium in the data processing system. Secondly, since the storage node includes an independent CPU, which is capable of independently processing the read request in the cache medium of the storage node, the caching and processing capability of the data processing system is increased each time a storage node is added. Additionally, a separate access channel is provided between the cache medium and the non-volatile storage medium of each storage node; from the perspective of the system, the number of access channels between the cache media and the non-volatile storage media is equal to the number of storage nodes in the data processing system, thereby improving performance of the data processing system in reading and writing data. Furthermore, the service processing node determines the address of the storage node according to the logical address carried in the read request, and forwards the read request to the storage node according to the address of the storage node. Compared with the prior art, tasks of caching and processing the read request are distributed to the storage nodes of the data processing system for processing, thereby reducing load of the service processing node.

Figure 6:
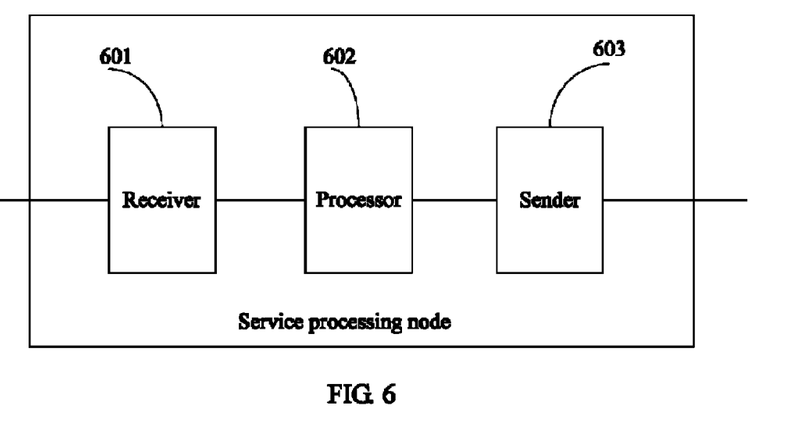
FIG. 6 is a schematic diagram of a service processing node according to an embodiment of the present disclosure.

FIG. 6 illustrates a service processing node provided in an embodiment of the present disclosure, including:

a receiver 601, adapted to receive a data operation request sent by a client, where the data operation request carries a logical address of a non-volatile storage block which the data operation request requests to operate;

a processor 602, adapted to determine, according to the logical address of the non-volatile storage block received by the receiver 601, an address of a storage node where the non-volatile storage block is located; and a sender 603, adapted to send, according to the address of the storage node determined by the processor 602, the data operation request received by the receiver 601 to the storage node, so that the data operation request is processed in a cache medium of the storage node under control of a CPU of the storage node, where the storage node includes the CPU, the cache medium, and a non-volatile storage medium, the non-volatile storage block being contained in the non-volatile storage medium.

The processor 602 is specifically adapted to perform a hash operation on the logical address of the non-volatile storage block to obtain a hash value, and obtain, according to the hash value, the address of the storage node where the non-volatile storage block is located corresponding to the hash value.

The service processing node provided in the embodiment of the present disclosure may further include:

a configurator, adapted to preconfigure mapping relationships between hash values and addresses of storage nodes;

where the processor 602 is specifically adapted to: perform the hash operation on the logical address of the non-volatile storage block to obtain the hash value; search, according to the hash value, in the mapping relationships preconfigured by the configurator for a mapping relationship between the hash value and the address of the storage node where the non-volatile storage block is located; and obtain the address of the storage node where the non-volatile storage block is located from the found mapping relationship.

Optionally, if the data operation request is a read request, the receiver 601 is further adapted to receive data requested by the read request and returned by the storage node; and the sender 603 is further adapted to send the data requested by the read request and received by the receiver 601 to the client.

According to the service processing node provided in the embodiment of the present disclosure, the sender sends, to the storage node, the data operation request sent by the client. Each storage node in a data processing system includes an independent CPU, a cache medium, and a non-volatile storage medium, and the cache medium in each storage node forms a cache pool, so that the capacity of the cache pool is increased each time a storage node is added, thereby enhancing scalability of the cache medium in the data processing system. Additionally, the processor determines, according to the logical address of the non-volatile storage block received by the receiver, the address of the storage node where the non-volatile storage block is located; and the sender forwards the data operation request to the storage node according to the address of the storage node. Compared with the prior art, caching and processing tasks are distributed to the storage nodes of the data processing system for processing, thereby reducing load of the service processing node.

Figure 7:
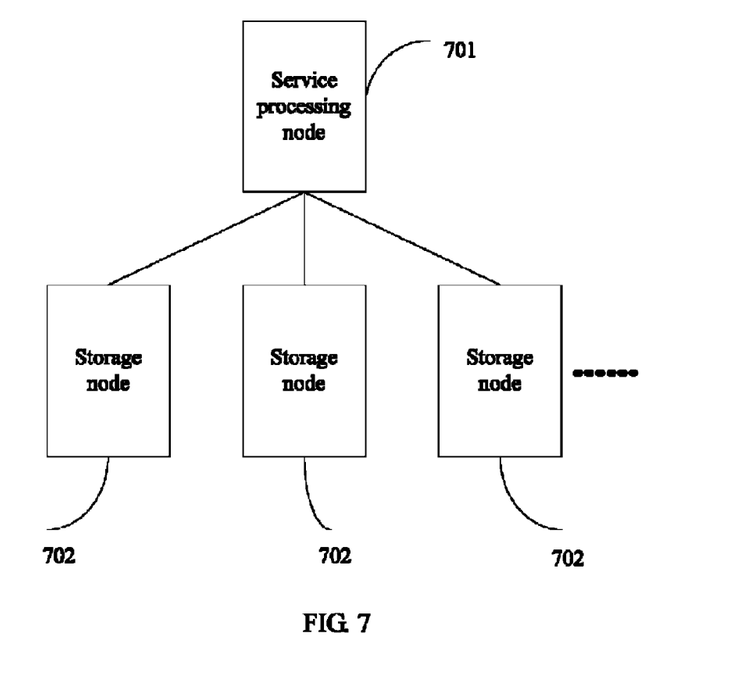
FIG. 7 is a schematic diagram of a block storage-based data processing system according to an embodiment of the present disclosure.

FIG. 7 illustrates a block storage-based data processing system provided in an embodiment of the present disclosure, including: a service processing node 701 and at least two storage nodes 702, each storage node including a CPU, a cache medium, and a non-volatile storage medium, and the cache medium in each storage node forming a cache pool.

The service processing node 701 is adapted to: receive a data operation request sent by a client; determine, according to a logical address of a non-volatile storage block which the data operation request requests to operate, an address of a storage node where the non-volatile storage block is located, where the logical address is carried in the data operation request; and send, according to the address of the storage node, the data operation request to the storage node where the non-volatile storage block is located.

The storage node 702 is adapted to receive the data operation request sent by the service processing node, and process, under control of the CPU thereof, the data operation request in its cache medium.

The service processing node 701 is specifically adapted to perform a hash operation on the logical address of the non-volatile storage block to obtain a hash value, and obtain, according to the hash value, the address of the storage node where the non-volatile storage block is located corresponding to the hash value.

Optionally, the service processing node may be the service processing node illustrated in FIG. 6.

For details of the method for specific interaction between various devices in the system, reference may be made to related description in the method embodiments, which are not described herein any further.

According to the block storage-based data processing method, apparatus, and system provided in the embodiments of the present disclosure, the service processing node finds, according to the logical address carried in the data operation request, the storage node corresponding to the data operation request in the data processing system. Each storage node in the data processing system includes an independent CPU, a cache medium, and a non-volatile storage medium, and the cache medium in each storage node form a cache pool, so that the capacity of the cache pool is increased each time a storage node is added, thereby enhancing scalability of the cache medium in the data processing system. Secondly, since the storage node includes an independent CPU, which is capable of independently processing the data operation request in the cache medium of the storage node, the caching and processing capability of the data processing system is increased each time a storage node is added. Additionally, a separate access channel is provided between the cache medium and the non-volatile storage medium of each storage node; from the perspective of the system, the number of access channels between the cache media and the non-volatile storage media is equal to the number of storage nodes in the data processing system, thereby improving performance of the data processing system in reading and writing data. Furthermore, the service processing node determines the address of the storage node according to the logical address carried in the data operation request, and forwards the data operation request to the storage node according to the address of the storage node. Compared with the prior art, tasks of caching and processing the data operation request are distributed to the storage nodes of the data processing system for processing, thereby reducing load of the service processing node. Still further, when the storage node receives the write request sent by the service processing node, the cache medium of the storage node stores the mapping relationship between the data carried in the write request and the logical address. Data can be written more quickly in the cache medium than in the non-volatile storage medium, thereby improving performance of the system. Still further, each storage node may be provided with a plurality of channels connected to other storage nodes. In this way, the number of channels will not become a bottleneck for redundancy backup, thereby improving performance of redundancy backup.

As can be seen from the description of the foregoing embodiments, a person skilled in the art may clearly understand that all or a part of steps in the method provided in the foregoing embodiments may be implemented by software plus a necessary general hardware platform. Based on such an understanding, the technical solutions in the present disclosure essentially, or the part contributing to the prior art may be embodied in a form of a software product. The computer software product may be stored in a storage medium, such as a ROM/RAM, a magnetic disk, and an optical disc, and includes several instructions for instructing a computer device (which may be a personal computer, a server, or a network device) to perform all or a part of the methods described in the embodiments of the present disclosure.

It should be noted that each embodiment in the specification is described in a progressive manner. For the same or similar parts in the embodiments, reference may be made to each other. Each embodiment illustrates in emphasis what is different from other embodiments. In particular, for the apparatus embodiment, since it is basically similar to the method embodiment, the apparatus embodiment is described simply, and the relevant part may be obtained with reference to the part of the description of the method embodiment. The foregoing described apparatus embodiments are merely exemplary, where, the units described as separate parts may or may not be physically separate, and the parts displayed as units may or may not be physical units, and may be located in one position, or may be distributed on a plurality of network units. A part or all of the modules may be selected according to actual needs to achieve the objectives of the solutions of the embodiments. A person of ordinary skill in the art may understand and implement the present disclosure without creative efforts.

In conclusion, the foregoing descriptions are merely exemplary embodiments of the technical solutions of the present disclosure, but are not intended to limit the protection scope of the present disclosure. Any modifications, equivalent replacements, or improvements made within the spirit and principle of the present disclosure shall fall within the protection scope of the present disclosure.

What is claimed is:

1. A block storage-based data processing method wherein the method being applied in a system comprising at least two storage nodes forming a storage pool, each storage node comprising a non-volatile storage medium, at least one logical volume corresponding to storage space in the storage pool and partitioned into a plurality of logical blocks, the method comprising:
   receiving, by a service processing node, a data operation request to the at least one logical volume sent by a client, wherein the data operation request includes a logical address of a non-volatile storage block which the data operation request requests to operate, the non-volatile storage block being contained in the non-volatile storage medium of a target storage node of the at least two storage nodes, the logical address identifying a logical block in the at least one logical volume, the identified logical block corresponding to the non-volatile storage block;
   performing, by the service processing node, a hash operation on the logical address of the non-volatile storage block to obtain a hash value;
   searching mapping relationships between hash values and addresses of the at least two storage nodes for obtaining an address of the target storage node according to the hash value; and
   sending, by the service processing node, the data operation request to the target storage node according to the address of the target storage node, to enable the data operation request to be processed in a cache medium of the target storage node under control of a CPU of the target storage node.

2. The method according to claim 1, wherein the method further comprising:

when the data operation request is a write request, under control of the CPU of the target storage node, storing, by the cache medium of the target storage node, a mapping relationship between data included in the write request and the logical address.

3. The method according to claim 2, wherein storing, by the cache medium of the target storage node, the mapping relationship between data included in the write request and the logical address comprises:

when the write request hits a cache of the target storage node, storing the mapping relationship between the data included in the write request and the logical address into the cache.

4. A service processing node, comprising:

a receiver, adapted to receive a data operation request to at least one logical volume in a system sent by a client, wherein the data operation request includes a logical address of a non-volatile storage block which the data operation request requests to operate, wherein the system comprises at least two storage nodes forming a storage pool, each storage node comprises a non-volatile storage medium, the at least one logical volume corresponding to storage space in the storage pool and partitioned into a plurality of logical blocks; the non-volatile storage block being contained in the non-volatile storage medium of a target storage node of the at least two storage node, the logical address identifying a logical block in the at least one logical volume, the identified logical block corresponding to the non-volatile storage block;

a processor, adapted to perform a hash operation on the logical address of the non-volatile storage block to obtain a hash value, and search mapping relationships between hash values and addresses of the at least two storage nodes for obtaining an address of the target storage node according to the hash value; and a sender, adapted to send, according to the address of the target storage node determined by the processor, the data operation request received by the receiver to the target storage node, to enable the data operation request to be processed in a cache medium of the target storage node under control of a CPU of the target storage node.

5. The service processing node according to claim 4, the processor further adapted to preconfigure the mapping relationships between the hash values and addresses of the at least two storage nodes.

6. A block storage-based data processing system, wherein the block storage-based data processing system comprising: at least two storage nodes forming a storage pool and a service processing node each storage node comprising a non-volatile storage medium, at least one logical volume corresponding to storage pace in the storage pool and partitioned into a plurality of logical blocks, wherein:

the service processing node is adapted to: receive a data operation request to the at least one logical volume sent by a client; wherein the data operation request includes a logical address of a non-volatile storage block which the data operation request requests to operate, the non-volatile storage block being contained in the non-volatile storage medium of a target storage node of the at least two storage nodes, the logical address identifying a logical block in the at least one logical volume, the identified logical block corresponding to the non-volatile storage block;

perform a hash operation on the logical address of the non-volatile storage block to obtain a hash value;

searching mapping relationships between hash values and addresses of the at least two storage nodes for obtaining an address of the target storage node according to the hash value;

and send, according to the address of the target storage node, the data operation request to the target storage node; and the target storage node is adapted to receive the data operation request sent by the service processing node, and process, under control of a CPU thereof, the data operation request in its cache medium.

7. The system according to claim 6, wherein the target storage node is further configured to store a mapping relationship between data included in the write request and the logical address under control of the CPU of the storage node when the data operation request is a write request.

8. The system according to claim 7, wherein the the target storage node storing the mapping relationship between data included in the write request and the logical address comprises:

when the write request hits a cache of the target storage node, storing the mapping relationship between the data included in the write request and the logical address into the cache.

* * * * *

UNITED STATES PATENT AND TRADEMARK OFFICE
CERTIFICATE OF CORRECTION

PATENT NO. : 9,507,720 B2  
APPLICATION NO. : 14/143186  
DATED : November 29, 2016  
INVENTOR(S) : Yu et al.

Page 1 of 1

It is certified that error appears in the above-identified patent and that said Letters Patent is hereby corrected as shown below:

In the Claims

Column 14, Line 41, "the the target" should read -- the target --.

Signed and Sealed this  
Fifth Day of September, 2017

Joseph Matal  
*Performing the Functions and Duties of the*  
*Under Secretary of Commerce for Intellectual Property and*  
*Director of the United States Patent and Trademark Office*